April 25, 1939. P. SWAN Re. 21,061

WATER HEATER

Original Filed March 5, 1934

INVENTOR.

Peter Swan.

BY Rudolph B. Prentice

ATTORNEY

Reissued Apr. 25, 1939

Re. 21,061

UNITED STATES PATENT OFFICE 21,061

WATER HEATER

Peter Swan, Portland, Oreg.

Original No. 2,015,296, dated September 24, 1935, Serial No. 713,988, March 5, 1934. Application for reissue October 5, 1936, Serial No. 104,088

7 Claims. (Cl. 122—170)

The principal object of my invention is the provision of a water boiler of enhanced efficiency and relatively light weight.

A second object of my invention is the improvement of facilities for cleaning the heat absorbing surfaces thereof.

A third object is the provision for easy repairs of the water-circulating parts thereof without disturbance of the setting or refractory linings which may be used with any of several methods of firing the same.

A fourth object is the conservation of floor space required for the operation of such units.

Other objects and advantages of my invention will be apparent in the following discourse wherein the significance of the reference characters in the accompanying drawing, details of construction and manner of operation of a typical water boiler of my invention, and the particular advantages thereof are explained.

Figure 1:
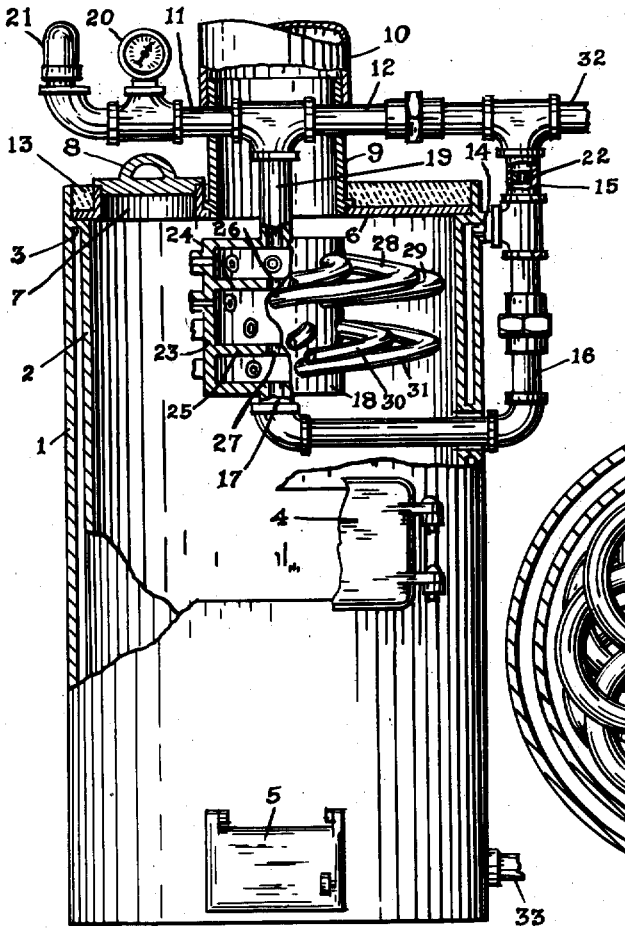
Figure 1 represents a view of the complete water boiler in fragmentary elevation and section.

In detail, the body of the boiler is constructed of an outer cylindrical shell of steel 1 inside of which in spaced and concentric relationship, is another cylindrical shell 2 secured in the former by annular pieces as 3 welded to both the said shells at the top and bottom thereof in a manner to form a water-jacket extending the entire height of the said body and encompassing the contained chamber throughout its entire circular extent.

Grates, or other firing means are disposed within the centrally contained chamber at a convenient altitude to divide the said centrally contained chamber into a combustion chamber and ash-pit respectively. Two doors 4 and 5, closing suitable communications to the said combustion space and ash-pit, give access for tending the fire.

The top of the combustion chamber is closed by a plate 6 of annular form loosely fitted within the upwardly extended outer shell 1 and supported upon the upper extremity of the inner shell 2 and annular piece 3 in a manner to permit of the rotation of plate 6 upon the said support.

The plate 6 is formed with an orifice 7 affording access to the interior of the combustion chamber at whatever portion thereof the said orifice is disposed near by rotation of the plate 6. This orifice 7 is closed by a suitable lid 8 conveniently removable.

A smoke outlet 9 providing communication between the said combustion chamber and the smoke pipe 10, is of cylindrical form rotatably mounted in the central opening of the plate 6 and is further provided with lateral, diametrically opposed perforations through which the pipe branches 11 and 12 extend.

A layer of insulating substance 13, adhering to the plate 6, is desirably provided to prevent the loss of heat at this place.

The top of the said water-jacket is tapped at 14 and pipes 15 and 16, extending upwardly and downwardly, are connected thereto. The lower branch 16 is extended by means of conventional pipe-fittings through the water-jacket but without communicating therewith to a point in the combustion chamber where an upwardly extending pipe connection 17, disposed in alignment with the central axis of the combustion chamber communicates with a water-tube unit 18 of special construction to be described further on.

The top of the water-tube unit 18 is connected through the pipe 19 with the pipes 11 and 12 extending laterally through the smoke outlet 9 as before described.

The usual relief valve and pressure or altitude gage 21 and 20 respectively are fitted to the pipe 11.

In the pipe 15, before described, a perforated plug 22 is secured to provide a relatively small communication between the uppermost part of the water-jacket tapped by the pipe 14 and the pipe 12.

The water-tube unit 18 is composed of a central cylindrical element 23 fitted with horizontally disposed partitions 24 and 25 both of which are perforated with relatively small holes indicated at 26 and 27. These partitions divide this cylindrical element into three chambers the uppermost and lowermost of which are tapped by series of angularly separated holes in staggered relationship. The middle chamber is tapped by two such series aligned respectively with those holes in the uppermost and lowermost chambers so that the two upper series of holes shall be in alignment and the two lower series of holes shall be aligned but in staggered relationship to the said two upper series of holes.

Figure 2:
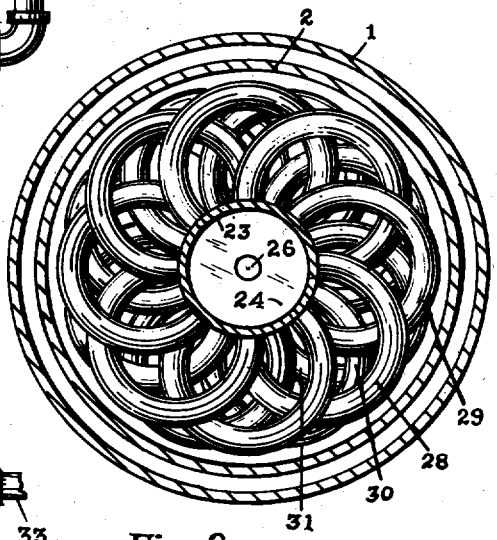
Figure 2 represents a view of a horizontal section through the boiler near the upper part thereof showing the relationship in that aspect of certain essential heat-absorbing surfaces.
Figure 3:
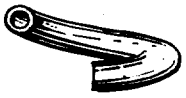
Figure 3 represents a view of a typical water-tube of the kind preferably used in the construction of certain elements of the boiler.

Each of these holes is connected to another hole situated on the opposite side of the horizontal partition nearest thereto by a water-tube in the form of a three-quarters portion of a complete turn of an helix of which the tubes 28, 29, 30 and 31 are typical and which are particularly illustrated in Figure 3. Each of the said water-tubes will thus extend from a point at one level on the cylindrical member helically to a point at another level angularly separated by ninety degrees of arc as illustrated in Figure 2.

The boiler is served by an outlet pipe 32 and a return pipe 33 which are connected to a heating system or hot water storage tank in the usual manner.

Considering the boiler to be connected to a hot water heating system or storage tank and filled with water in the usual manner the operation thereof is as follows:

Cold water enters the lower part of the water-jacket through the pipe 33 and absorbs heat from the adjacent ash-pit and body of fire progressively as it rises in response to the difference in pressure common to the thermosiphon. During the process of heating, certain small quantities of dissolved air will be released from the water in the jacket and rise to the top thereof. These small quantities of air or other gases accumulating in the upper part of the water-jacket will escape through the perforation in the plug 22 into the outlet 32 as will also an inconsiderable quantity of warm water.

The greater volume of water will flow downwardly through the pipe 16 and thence enter the lower part of the water-tube unit 23 where it flows centrifugally in the lowermost chamber to enter the lower ends of the helical water-tubes as 30 and 31. The flow of water is thence continued through these helical tubes, disposed symmetrically through the combustion space, to the middle chamber of the cylindrical element where it flows first centripetally and laterally in a centrifugal direction, impelled as well by a whirling motion induced by the action of the helical tubes, to enter the lower end of the upper series of helical tubes terminating in the upper part of the said middle chamber.

The water is thence carried outwardly and upwardly through the upper series of helical tubes to different portions of the combustion space from whence it returns to the uppermost chamber in the cylindrical element where it flows centripetally to enter the pipe 19 through which it is conducted to the pipe 12 and thence out through the system to return when cooled through the return pipe 33.

During the passage of the water through the helical tubes the temperature thereof will be raised considerably and further quantities of dissolved air and other gases will be released into the central chambers. Egress for these gases is provided for by the perforations in the horizontally disposed partitions 24 and 25, effectively preventing air-binding of the water-tubes and consequent overheating thereof.

Now it will be especially observed that the height of the whole apparatus as related to the heat absorbing capacity thereof is materially lessened by the method of construction employed and in consequence, the total area of exposed radiating surfaces through which heat losses may occur is very appreciably reduced. Again the forces actuating the circulation of water are relatively reduced and larger and more substantial pipe sizes may be employed without serious loss of efficiency.

The form of the helical water-tubes is of special importance. This form provides for a more nearly uniform distribution of the heat absorbing surfaces because of the fact that the most nearly centrally disposed portions thereof are virtually radial while the outer portions or loops are disposed with the greatest linear magnitude thereof near the largest circumference of the combustion space. This is particularly apparent upon inspection of the Figure 2.

In another manner of consideration, this form of water-tube provides for the greatest radius of curvature thereof throughout the whole extent and thus provides for a minimum of frictional resistance to the passage of water therethrough. It again provides for a very uniform disturbance of the water in passage therethrough to effect the contact of more portions of water with the heating surfaces so that the water may be heated by direct contact with the metal of the tubes rather than through conduction in the water itself or normal processes of convection unassisted by mechanical action.

As is well understood, the greatest efficiency is to be attained only by providing for as great a temperature differential between the gases of combustion and the water to be heated as possible. It will be understood that this effect is accomplished to a very high degree in the heater of my invention in which the water is conducted progressively from the parts of lowest to the parts of highest temperature.

Besides the very high operating efficiency, the water-boiler of my invention embodies many other unique advantages in combination therewith.

The lid 8 may be easily removed and access had to all parts of the water-tubes for cleaning by revolving the plate 6. This plate is also conveniently entirely removed for the replacement of the water-tube unit or other service requiring access to the full combustion chamber diameter. The method of removal of this plate is as follows: The upper pipe-union is broken and the fittings unscrewed to free the smoke outlet 9 which may be then removed. This done, the plate 6 may be lifted out giving clear access to the whole of the combustion chamber. If it is necessary to remove the water-tube unit, this may be accomplished by breaking the lower union and unscrewing the horizontal length of pipe therefrom when the unit will be free to lift out.

It will be obvious that all of these services can be accomplished without disturbing the setting of the boiler or the refractory lining of the firebox. Neither is it necessary to disturb the outlet or return pipe lines further than to drain the water therefrom.

From a study of the Figures 1 and 2 it will be further apparent that the water-tube unit as constructed of helical water-tubes constitutes a kind of screw directing the flow of the products of combustion in a spiral motion thereby causing the actual contact thereof with the water-tubes in smaller and hotter portions than is common in the case of boilers constructed with rectilinear flues wherein portions of very hot gases may be conducted therethrough without actual contact with the heating surfaces from which the same are insulated by already cooled portions.

Gases moving in simple translatory motion are relatively undisturbed; portions thereof centrally contained remaining so. On the other hand, gases moving in spiral courses are constantly disturbed and the relative positions of various portions thereof are constantly changing. This is the result accomplished in the heater of my invention to the end that the greatest possible proportion of the products of combustion may be urged into actual contact with heat absorbing surfaces inside of which flow currents similarly agitated to urge the coolest portions thereof into actual contact with the heating surfaces.

In addition certain manufacturing advantages inherent in this construction are of great importance. It will be obvious that the manufacture of helical water tubes can be more easily accomplished than any other curved or bent form. The tubes in my boiler may be made in continuous length and cut thereafter into three-quarter turn lengths described. The whole assembly being admirably adapted for welding processes, obvious economies of labor are provided for.

The total advantages of my invention provide high operating efficiencies, facility of maintenance and repair and economies of weight and manufactured cost of great value.

What I claim is:

1. A water boiler comprising, a water-jacket contained between two shells housing a fire box and combustion chamber, a water-tube unit disposed within said combustion chamber intercommunicating means connecting the upper part of said water-jacket with the lower part of said water-tube unit, an inlet and an outlet communicating with the lower part of said water-jacket and the upper part of said water-tube unit respectively, a communication of relatively small capacity connected with the upper part of said water-jacket and the said outlet, and a suitable closure for the top of said combustion chamber formed with a suitable smoke outlet wherein the said water-tube unit is constructed of a series of vertical axially aligned cylindrical chambers the lowermost and uppermost of which are formed with an inlet and outlet respectively, and a series of three-quarter-turn helical water-tubes arranged in symmetrical groups about said chambers and connected at opposite ends to adjacent said chambers at places angularly separated by ninety degrees of arc, the said cylindrical chambers being connected together by an additional connection of relatively small capacity to provide egress for accumulated quantities of gases.

2. A water boiler comprising, a water jacket contained between two shells housing a fire-box, a water-tube unit disposed over said fire box, intercommunicating means connecting the upper part of said water jacket with the lower part of said water-tube unit, an inlet and outlet communicating with the lower part of said water-jacket and the upper part of said water-tube unit respectively and a suitable housing for said water-tube unit disposed upon the said water jacket and provided with a suitable smoke outlet wherein the said water-tube unit is constructed of a series of vertical axially aligned cylindrical chambers the lowermost and uppermost of which are formed with an inlet and outlet respectively and a series of three-quarter-turn helical water-tubes arranged in symmetrical groups about said chambers and connected at opposite ends to adjacent said chambers at places angularly separated by ninety degrees of arc, the said cylindrical chambers being further connected together by communications of relatively small capacity to provide egress for accumulated gases.

3. A water tube unit for water boilers comprising, a vertically disposed cylinder containing a series of superposed chambers separated by horizontally disposed partitions, a series of helical water-tubes connecting said adjacent chambers, and relatively small ports connecting said adjacent chambers together through said horizontal partitions to provide for the egress of gaseous accumulations.

4. A water tube unit for water heaters comprising, a vertically disposed cylinder containing a series of superposed chambers separated by horizontally disposed partitions the lowermost and uppermost of which are formed with an inlet and outlet respectively, a series of three-quarter turn helical water-tubes connecting adjacent said chambers arranged in symmetrical groups about said chambers at places angularly separated by ninety degrees of arc, and relatively small ports connecting said adjacent chambers together through said horizontal partitions to provide for the egress of gaseous accumulations.

5. A water tube unit for water boilers, comprising a vertically disposed cylinder containing a series of superposed chambers separated by horizontally disposed partitions, a series of helical water tubes connecting said adjacent chambers, and relatively small ports connecting said adjacent chambers to provide for the egress of gaseous accumulations.

6. A water tube unit for water heaters, comprising a vertically disposed cylinder containing a series of superposed chambers separated by horizontally disposed partitions, a series of helical water tubes connecting said adjacent chambers, the lowermost and middle chambers being provided with a relatively small port in the uppermost portion of each said chamber for the egress of gaseous accumulations.

7. A water tube unit for water heaters, comprising a vertically disposed cylinder containing a series of superposed chambers separated by horizontally disposed partitions, a series of helical water tubes connecting adjacent said chambers, the lowermost and middle chambers being provided with a relatively small port in the uppermost portion of each said chamber and venting into the water system at a higher elevation for the egress of gaseous accumulations.

PETER SWAN.